(12) United States Patent
Murase

(10) Patent No.: US 7,949,847 B2
(45) Date of Patent: May 24, 2011

(54) STORAGE EXTENT ALLOCATION METHOD FOR THIN PROVISIONING STORAGE

(75) Inventor: Atsushi Murase, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 795 days.

(21) Appl. No.: 11/605,440

(22) Filed: Nov. 29, 2006

(65) Prior Publication Data

US 2008/0126734 A1    May 29, 2008

(51) Int. Cl.
*G06F 12/00* (2006.01)
*G06F 15/167* (2006.01)
*G06F 15/173* (2006.01)
*G06F 9/146* (2006.01)

(52) U.S. Cl. ........ 711/170; 709/214; 709/215; 709/225; 709/226; 711/114; 711/153; 711/154; 711/156; 711/171; 711/172; 711/173; 711/E12.084; 718/104; 718/105

(58) Field of Classification Search .................. 711/114, 711/154, 170, E12.084, 153, 156, 171, 172, 711/173; 709/214, 215, 225, 226; 718/104, 718/105
See application file for complete search history.

(56) References Cited

U.S. PATENT DOCUMENTS

| | | | |
|---|---|---|---|
| 6,636,958 B2 * | 10/2003 | Abboud et al. ............... | 711/173 |
| 7,263,578 B2 * | 8/2007 | Kano ............................. | 711/112 |
| 7,428,614 B2 * | 9/2008 | Murase ......................... | 711/114 |
| 7,603,529 B1 * | 10/2009 | MacHardy et al. .......... | 711/162 |
| 2002/0023225 A1 * | 2/2002 | Lomnes ........................ | 713/200 |
| 2004/0088505 A1 * | 5/2004 | Watanabe ..................... | 711/161 |
| 2004/0133570 A1 * | 7/2004 | Soltis ................................. | 707/3 |
| 2004/0162958 A1 * | 8/2004 | Kano et al. ................... | 711/170 |
| 2004/0230766 A1 * | 11/2004 | Cameron ...................... | 711/203 |
| 2005/0086443 A1 * | 4/2005 | Mizuno et al. ................ | 711/162 |
| 2007/0016746 A1 * | 1/2007 | Kano ............................. | 711/165 |
| 2007/0061540 A1 * | 3/2007 | Rafert et al. .................. | 711/170 |
| 2007/0067588 A1 * | 3/2007 | Kano et al. ................... | 711/162 |
| 2007/0156957 A1 * | 7/2007 | MacHardy et al. .......... | 711/114 |
| 2007/0233868 A1 * | 10/2007 | Tyrrell et al. ................. | 709/226 |
| 2008/0120459 A1 * | 5/2008 | Kaneda et al. ................ | 711/112 |
| 2008/0229048 A1 * | 9/2008 | Murase et al. ................ | 711/171 |

* cited by examiner

*Primary Examiner* — Kevin L Ellis
*Assistant Examiner* — Mehdi Namazi
(74) *Attorney, Agent, or Firm* — Mattingly & Malur, PC

(57) ABSTRACT

A thin provisioning storage system is able to present a thin provisioned volume to a computer, such that the computer stores data to the volume as if storage space on disk drives was already allocated for the volume. Upon receiving a write request from the computer, in which the write request is directed to an area of the volume for which storage space on the disk drives has not yet been allocated, the storage system allocates new space on the disk drives. When allocating the new space, the storage system obtains a designated performance level for the volume, and determines a number of storage extents to be allocated to the volume based upon the determined performance level. The storage system also is able to take into account performance metrics for the disk drives and/or array groups when selecting locations from which to allocate the storage extents.

23 Claims, 9 Drawing Sheets

Logical Element Structure

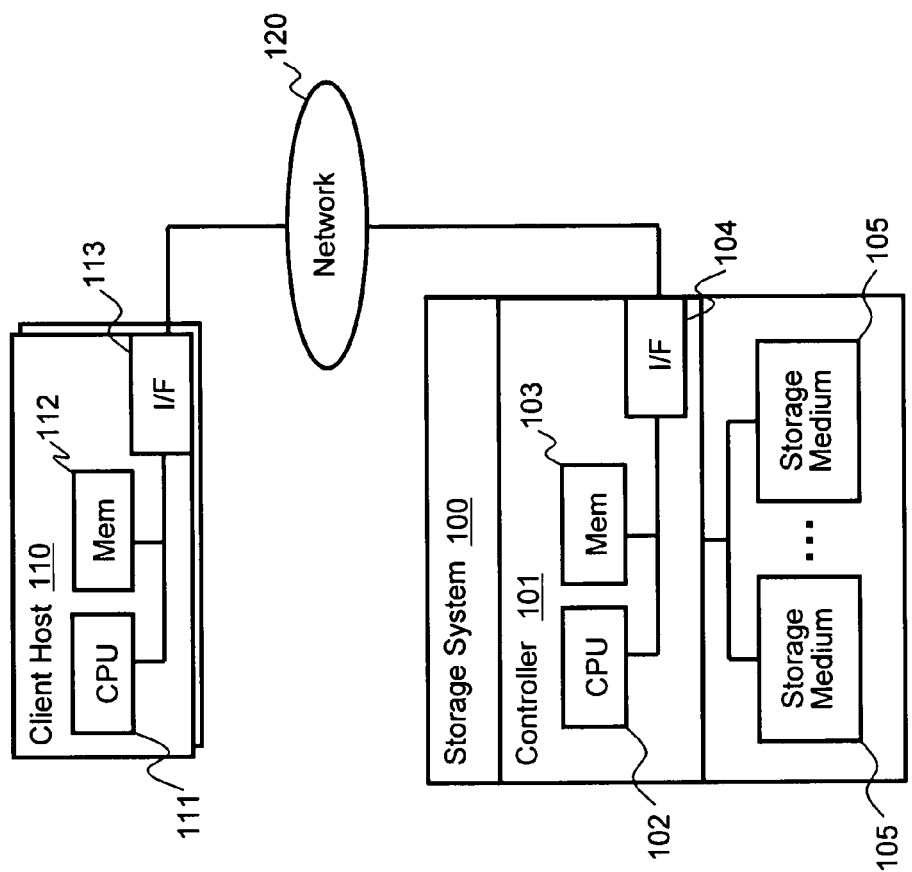
FIG. 1 Hardware Architecture

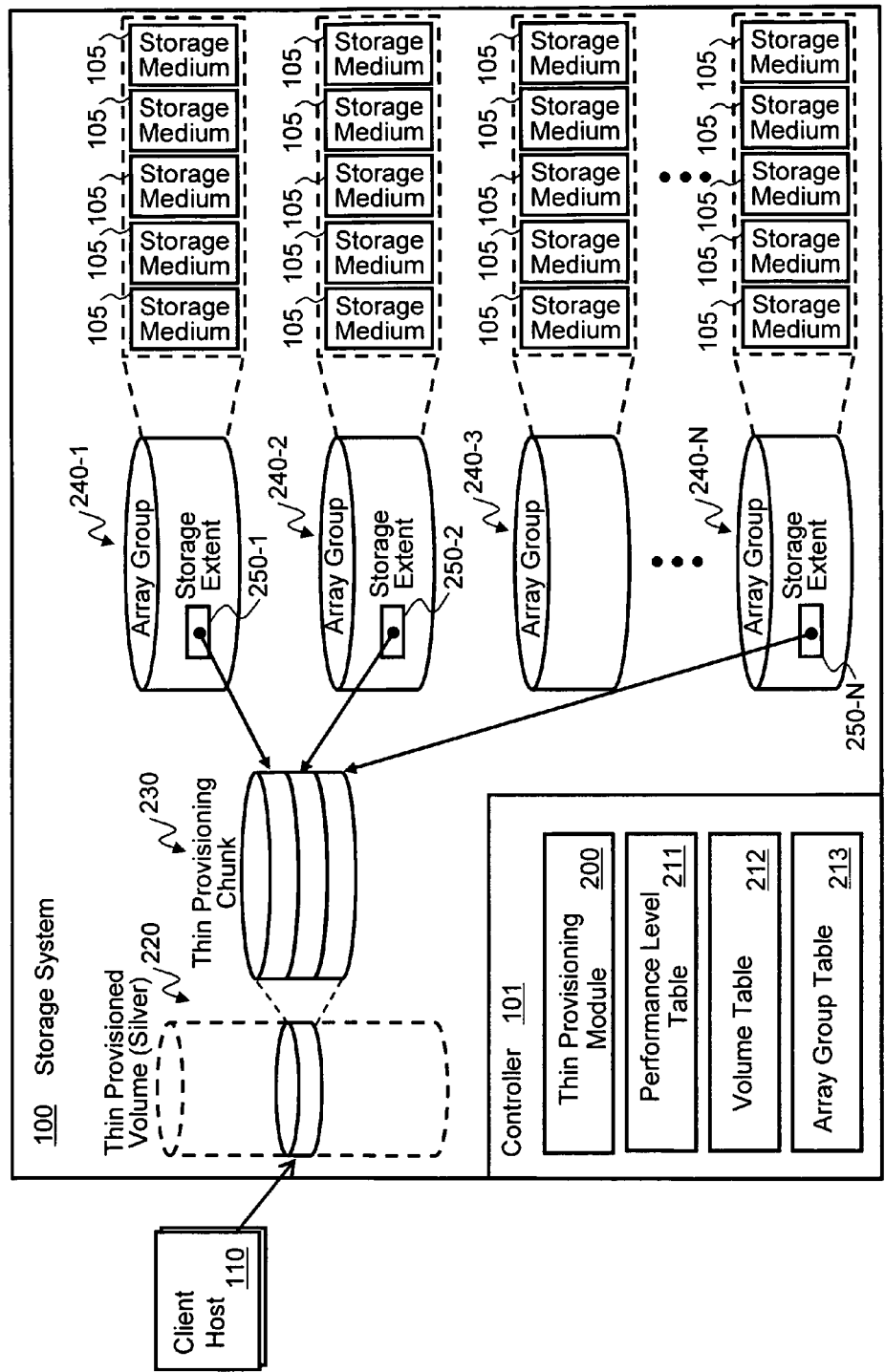
FIG. 2 Logical Element Structure

| Performance Level | Number of Storage Extents to Allocate |
|---|---|
| Gold | 5 |
| Silver | 3 |
| Bronze | 1 |
| ... | ... |

FIG. 3 Data Structure of Performance Level Table

| Volume ID | Performance Level |
|---|---|
| V100 | Bronze |
| V200 | Bronze |
| V300 | Silver |
| ... | ... |

FIG. 4 Data Structure of Volume Table

| Array Group ID | Free Space | Number of Storage Extents In Use | I/O Usage Ratio |
|---|---|---|---|
| A1 | 8,150,238,732,578 | 23 | 12% |
| A2 | 1,951,941,234,190 | 5 | 5% |
| A3 | 5,851,734,588,103 | 1 | 1% |
| ... | | | ... |

FIG. 5 Data Structure of Array Group Table

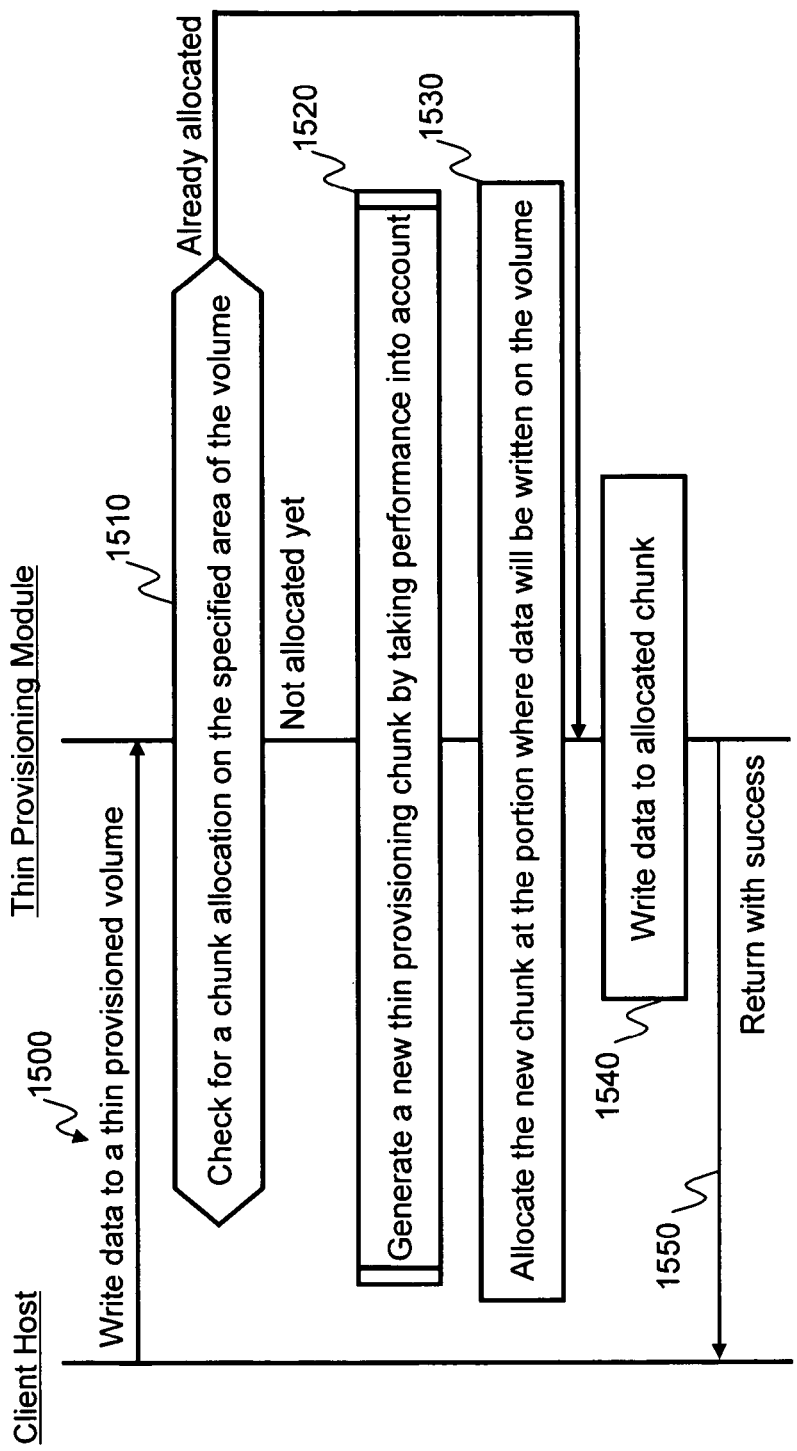
FIG. 6 Process to Write Data to Unallocated Area of a Thin Provisioned Volume

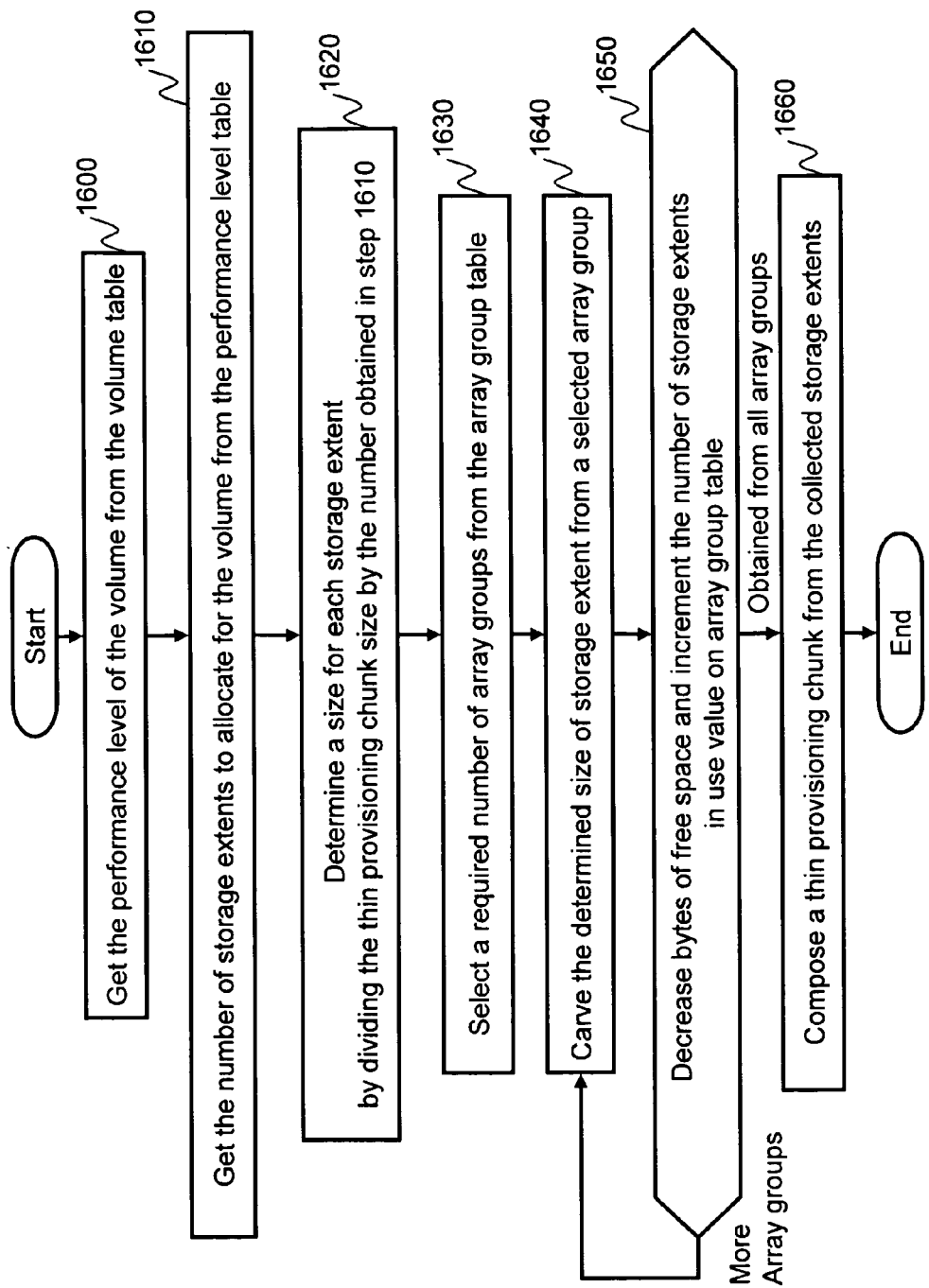
FIG. 7 Process to Generate Thin Provisioning Chunk

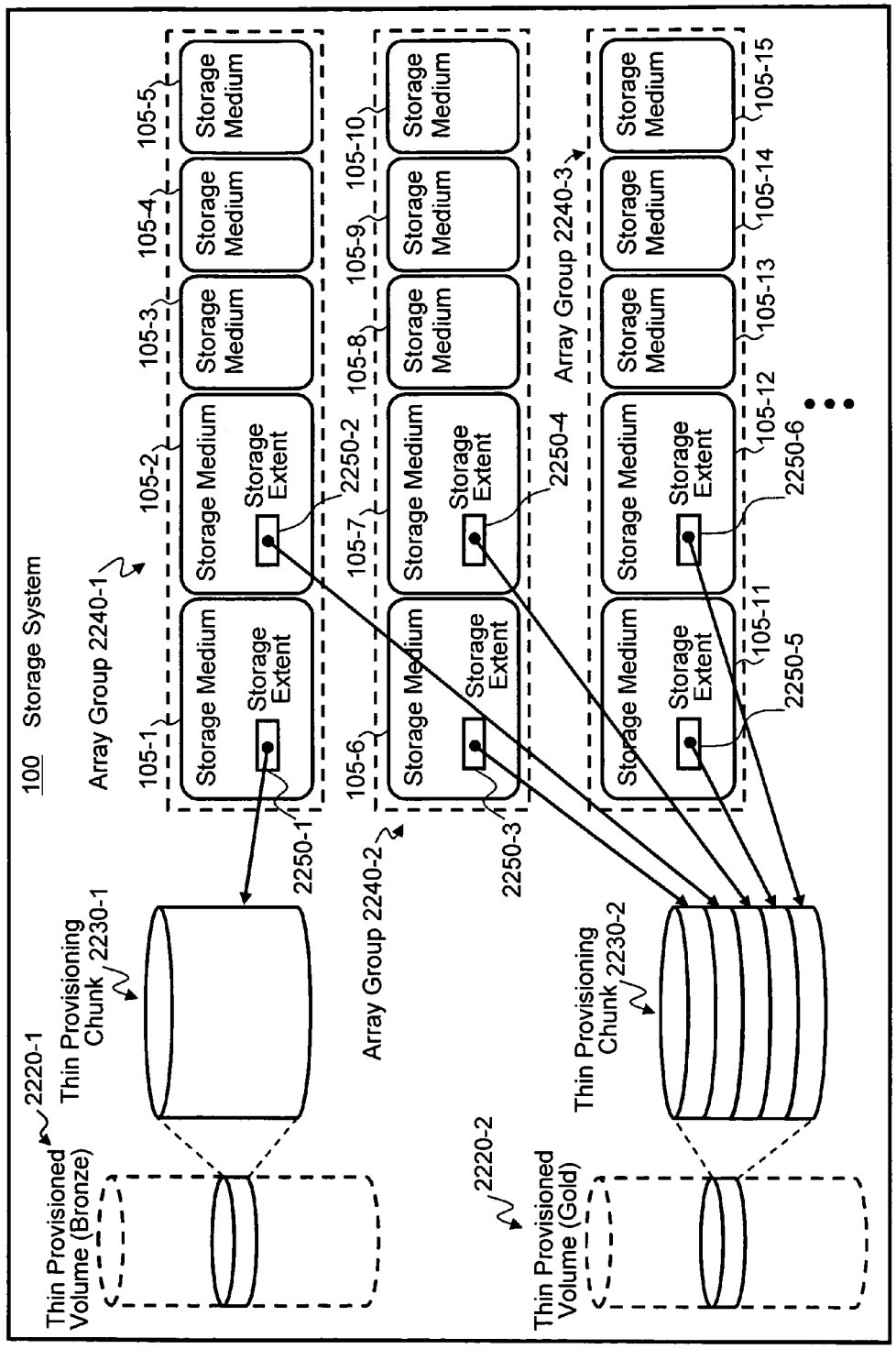
FIG. 8 Logical Element Structure

| Disk ID | Free Space | Number of Storage Extents In Use | I/O Usage Ratio |
|---|---|---|---|
| D1 | 28,150,238,732 | 23 | 45% |
| D2 | 151,941,234,190 | 5 | 12% |
| D3 | 243,734,588,103 | 1 | 2% |
| ... | ... | ... | ... |

FIG. 9 Data Structure of Disk Table

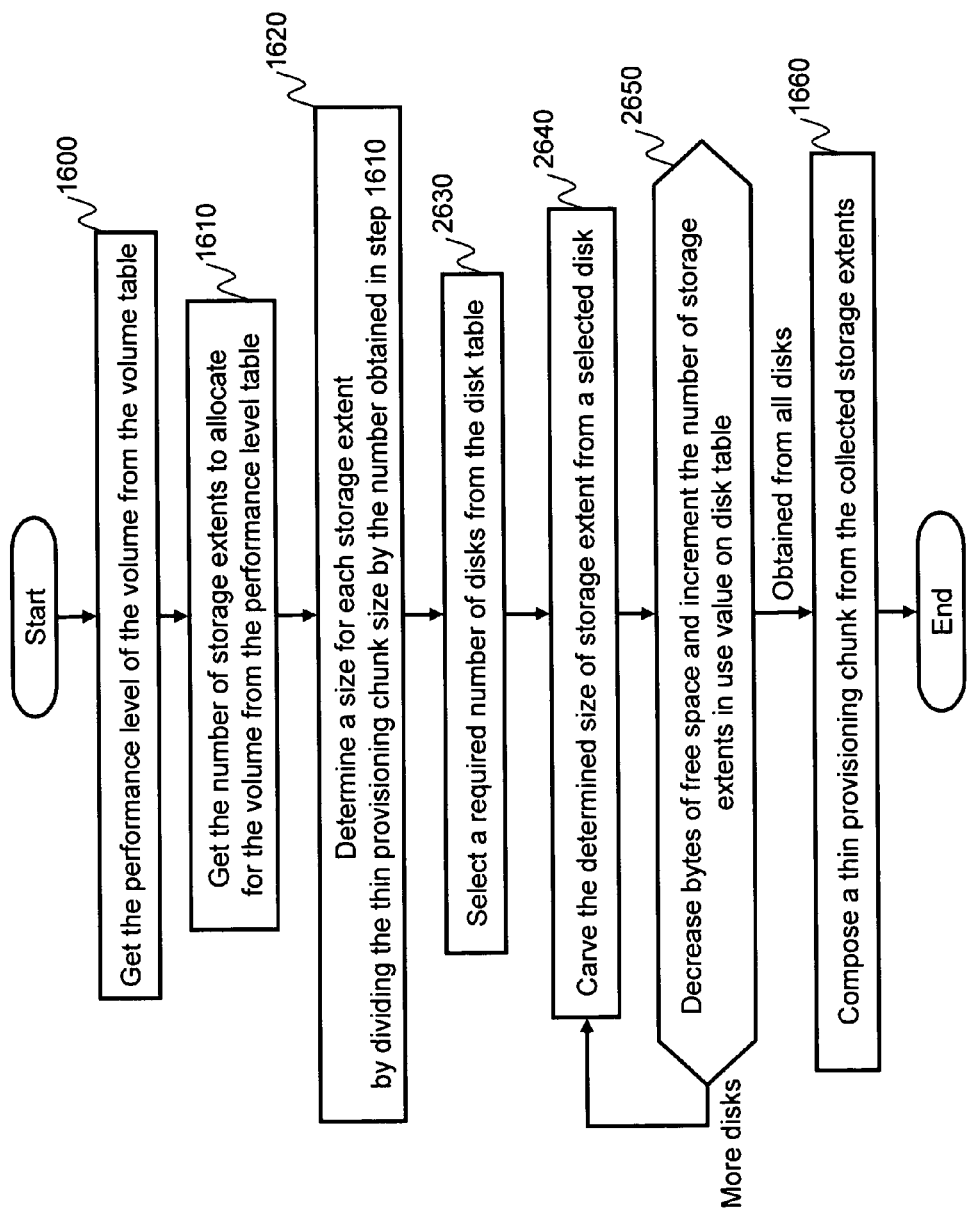
FIG. 10 Process to Generate Thin Provisioning Chunk

STORAGE EXTENT ALLOCATION METHOD FOR THIN PROVISIONING STORAGE

BACKGROUND OF THE INVENTION

1. Field of the Invention

The present invention relates generally to storage systems.

2. Description of Related Art

The amount of enterprise data is growing by more than 60% every year in some industries. Thus, storage administrators in these industries are frequently required to add storage capacity to their storage systems, which can be quite costly. Also, storage administrators are often required to reduce inefficient use of storage capacity in the systems that they manage due to budget restrictions. To help solve these problems a technology has emerged that is known as a "thin provisioning storage system". Thin provisioning is a technology that enables storage space to be allocated to users, on a just-enough or just-in-time basis, rather than pre-allocating to users large storage spaces that may not ever be utilized. A thin provisioning storage system will typically present and make available to a user what is essentially a virtual volume that appears to have a very large size. However, the actual storage extent of the virtual volume is not yet allocated until the storage space is actually required by the user. When the user writes data to a certain area (e.g., issues a write command), then an actual storage extent is allocated from physical disks in the thin provisioning storage system. Thus, thin provisioning allows the efficiency of storage capacity utilization to be improved without heavy administrative overhead. When thin provisioning is incorporated, businesses are able to operate with less storage capacity, and defer frequent addition of storage capacity, while also reducing the operating costs associated with maintaining large amounts of unused disk capacity. US Pat. Appl. Pub. 2004/0162958, to Kano et al., entitled "Automated On-Line Capacity Expansion Method for Storage Device", filed Feb. 23, 2004, the disclosure of which is incorporated herein by reference, discloses such a storage system that includes automated on-line capacity expansion capability.

In addition to the foregoing, the capacity of hard disk drives is increasing rapidly, but the performance of these drives (i.e., the speed of data writing and retrieval) is not keeping pace with the increases in capacity. For example, studies have shown that since 1991, disk drive capacity has been increasing by an average of 60% per year. However, the performance of the disk drives has been increasing by less than 10% per year. This trend of the disproportionate growth of disk capacity relative to the increase in disk performance is leading to a performance bottleneck at each disk because a single disk is able to hold huge amounts of data, while the disk interface does not have enough speed to process requests to read or write this data. Thus, when a disk holds a large amount of data, and one or more computers are trying to access the data on that disk, a decrease in response time can result as the disk interface attempts to read data from the disk or write data to the disk in response multiple access requests. As a result, in order to ensure a particular level of performance, each disk might intentionally be used in a low utilization mode, which is inefficient and results in high disk cost and low utilization.

A bottlenecking problem similar to that discussed above can occur on a thin provisioning storage system. Because a thin provisioning storage system encapsulates the physical structure of the device, allocated thin-provisioned storage extents might be repeatedly allocated from same disk (or a single disk group composing a RAID), and the user does not know of or cannot control this behavior. Therefore an automated solution is needed for allocating storage extents of a thin provisioning storage system so as not to conflict on a single disk or disk group, but instead to intelligently distribute allocation and utilization of allocated storage extents onto separate disks or disk groups.

BRIEF SUMMARY OF THE INVENTION

Embodiments of the invention ensure a certain level of data access performance of a storage system by avoiding or lessening the conflict or overlap of allocated storage extents on a single disk or array group, and instead distributing allocated storage extents to separate disks or separate array groups, while also being able to take into account one or more performance metrics. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 1 illustrates an exemplary hardware architecture in which the invention may be realized.

FIG. 2 illustrates an exemplary logical element structure of the invention.

FIG. 3 illustrates a data structure of a performance level table.

FIG. 4 illustrates a data structure of a volume table.

FIG. 5 illustrates a data structure of an array group table.

FIG. 6 illustrates a process for writing data to an unallocated area of a thin provisioned volume.

FIG. 7 illustrates a process to generate a thin provisioning chunk.

FIG. 8 illustrates an exemplary logical element structure of additional embodiments of the invention.

FIG. 9 illustrates a data structure of a disk table.

FIG. 10 illustrates a process to generate a thin provisioning chunk in the additional embodiments.

DETAILED DESCRIPTION OF THE INVENTION

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

In a preferred embodiment, the thin provisioning storage system of the invention presents a thin provisioned volume to a client host. The thin provisioned volume is represented as if it has a full size of user-specified capacity allocated to it, but the actual storage extent that has been allocated from the physical disks is only for the portion where the client host has written data.

Real capacity will be provisioned eventually in small allocations which may be referred to as thin provisioning chunks. The thin provisioning chunks are each composed of one or more smaller pieces of storage extents allocated from respective array groups. For example, a storage extent may be made up of one or more standard data blocks of storage space on a disk. Also, in the case of a RAID (redundant array of independent disks) configuration, such as a plurality of data disks, a storage extent might consist of a minimum of one data block on each of these disks, but could be made up of any number of data blocks on each disk, depending on the configuration of the particular system. Further, an array group is the logical capacity composed by a plurality of physical disks, typically to protect data by having redundant data in the disk array group. In some preferred embodiments, the array groups are in a RAID configuration for forming a RAID array group, which may also be capable of providing data protection.

The storage system of this invention is able to automate the determination of how many storage extents and from which array group to allocate storage extents to compose a thin provisioning chunk when the client host has written data to a new portion of the thin provisioned volume. The storage system also may include a table that shows the target performance level of every thin provisioned volume. Therefore, when new chunk allocation is required to the particular thin provisioned volume the storage system decides the number of storage extents to compose a new thin provisioning chunk based on the performance level of that particular volume. If the required level of performance is high, then the storage system will allocate a large number of separate storage extents for the new chunk so as to distribute data access across a number of different array groups, thereby better ensuring high performance of data throughput.

The storage system then selects appropriate array groups that the storage extents will be allocated from. This determination is performed by taking into account utilization amounts of each array group, such as how many storage extents have been allocated and used from a particular array group so far, and/or how often disks in a particular array group are in use (accessed) within a certain period of time. Thus, embodiments of the invention provide a method and apparatus for automating the control of distribution of the data access for a particular volume based on a pre-agreed performance level so as to actualize performance scalability on the virtualized storage environment.

FIG. 1 illustrates an example of physical hardware architecture that may be used to implement some embodiments of the invention. The overall system consists of a storage system 100 and one or more client hosts 110. Client hosts 110 and storage system 100 are connected through a network 120. Network 120 may be any variety of network type, such as Ethernet, Fibre Channel (FC), or the like.

Storage system 100 includes a controller 101 and storage mediums 105. Controller 101 includes a CPU 102, a memory 103, and a network interface (I/F) 104. Storage mediums 105 are connected to controller 101 through a local bus, FC connection, or the like. Storage mediums 105 are hard disk drives in the preferred embodiment, but may be any of a variety or combination of other storage devices such as, flash memory, optical disks, tape, and so on. Each client host 110 may be a computer that includes a CPU 111, a memory 112, and a network interface 113 for communicating with storage controller I/F 104 via network 120. In some embodiments, client host 110 acts as a terminal computer for the storage service user.

FIG. 2 illustrates a software and logical element structure of some of the preferred embodiments. In the storage system 100, the storage media 105 are logically configured into a plurality of array groups 240-1 through 240-N. Thus, each array group 240 is the logical capacity which is composed by the plural storage media 105 in that group 240. Each array group 240 may be configured as a RAID group. For example, each array group 240 can be composed as a RAID 5 configuration with a logical capacity of four disks of for storing data and one parity disk for a total of five disks. Of course, other RAID configurations or array group configurations may also be used.

A storage extent 250 is the piece of capacity that is carved (allocated) from an array group. The actual size of the storage extent 250 may be dependent on the configuration of the storage system, type of storage media, and the like. For example, in some embodiments, if the storage media are hard disk drives having a physical data block size of 512 bytes, then the smallest storage extent that could be carved from an array group of four data disks and one parity disk is 2048 (4×512) bytes. It should be noted that the foregoing is only an example for explanation purposes, and the invention is not limited to any particular storage media or any particular size for a storage extent 250.

Any number of thin provisioned volumes may be provided by storage system 100 for use by client hosts 110. As illustrated in FIG. 2, initially a thin provisioned volume 220 is essentially a virtual storage volume that is exposed to client hosts 110. Thin provisioned volume 220 is represented to client hosts 110 as if it has a full size of a predetermined capacity, but the amount of capacity that is actually allocated is equal to the number of storage extents allocated to the portion of the volume 220 where the client host has already written data, or some minimum allocation. Thus, when the client host 110 writes data to an area of volume 220 where the real storage extent is not yet allocated on the storage media, then the storage system will generate a new thin provisioning chunk 230 and associate the new chunk 230 with the thin provisioned volume 220 as the real storage extent for the portion of volume 220 that client host 110 writes to. As will be discussed in more detail below, the thin provisioning chunk 230 is composed of one or more storage extents 250 that are carved from array groups 240.

Controller 101 of storage system 100 includes a thin provisioning module 200 that may be stored in memory 103 or other computer readable medium, and that may be executed by CPU 102 of controller 101. Thin provisioning module 200 is a program of the invention implemented to provide the thin provisioning service to client hosts 110. Thin provisioning module 200 controls reading and writing of data on the thin provisioned volume 220, and manages the generation of new thin provisioning chunks 230 when they are needed. Thin provisioning module 200 may also automatically determine how many storage extents to allocate, and from which array groups to carve storage extents when generating a new thin provisioning chunk.

In some preferred embodiments, thin provisioning module 200 uses three tables during its operation. These tables may also be retained in or retrieved into memory 103, and are as follows. A performance level table 211 holds records which specify the number of storage extents that should be allocated for each agreed performance level. A volume table 212 holds records that show the assigned performance level of each thin provisioned volume currently maintained by the storage system 100. An array group table 213 holds records of array group information that enables thin provisioning module 200 to determine the optimal array group from which to carve a storage extent when a new storage extent is to be allocated. Each of these tables is discussed below.

FIG. 3 illustrates an example data structure of performance level table 211. Performance level table 211 includes entries for a specified performance level 510, and the number of storage extents to allocate 520. The performance level 510 is the level of ensured performance that might be requested or specified by a client host or administrator. In the example shown, the levels are listed as "gold", "silver", and "bronze", to indicated three different classes of performance level. Of course, other types of designations might be used to indicate different classes or hierarchies of performance levels, such as "high", "medium" and "low", numerical designations, and the like, and the number of different performance levels is not limited to three.

The number of storage extents to allocate 520 indicates how many different storage extents should be allocated to a thin provisioning chunk of a specific performance level in a thin provisioned volume. For instance, line 591 represents a record of a performance level 510 of "Gold" and shows that "5" storage extents will be carved from respective array groups when generating a new thin provisioning chunk 230 of the thin provisioned volume 220 defined as "Gold" performance level. Similarly, line 592 shows that a thin provisioned volume having a silver performance level is allocated three separate storage extents, while line 593 shows that a thin provisioned volume having a bronze performance level is allocated from only one storage extent. Of course, the numbers shown here are exemplary only, and may vary in actual application.

Thus, performance level table 211 is referred to by thin provisioning module 200 to find the number of storage extents to be allocated for a thin provisioned volume 220 having a particular performance level specified. Records on table 211 can be predefined or can be operated by other means (for instance, changing the number of a particular level or adding a new level).

FIG. 4 illustrates an example data structure of volume table 212. Volume table 212 includes entries for a volume identifier (ID) 610 and a performance level 620. The volume ID 610 provides identification of each thin provisioned volume in the storage system. The performance level 620 lists the type or class of performance level that is specified for each thin provisioned volume. For instance, line 691 represents a record of a thin provisioned volume which has "V100" as the volume ID 610, and this volume has been configured as a "Bronze" level for the performance level 620. Line 692 illustrates a similar performance lever of the thin provisioned volume having volume ID of "V200". Line 693, on the other hand, illustrates a record for a thin provisioned volume "V300" having a "Silver" level as its performance level.

The volume table 212 is referred to by thin provisioning module 200 to determine a corresponding performance level of a specific thin provisioned volume that is a target of allocation of a thin provisioning chunk. Records on this table would typically be generated by thin provisioning module 200 when a user requests creation of a new thin provisioned volume. Volume ID 610 may be created by the storage system or the user, and the performance level can be a value specified by the user, or may be a predetermined level dependant on the type of user, class of user, or the like.

FIG. 5 illustrates an example data structure of array group table 213. Array group table 213 includes entries for an array group ID 710, free space 720, number of external storage extents in use 730, and I/O (input/output) usage ratio 740. The array group ID 710 serves to identify each of the array groups 240 on the storage system 100. Free space 720 indicates the size of free space (unallocated capacity) of each of the array groups 240. The size of the free space can be used by the thin provisioning module 200 to determine the capability to carve a certain size of storage extent from the array groups. The number of storage extents in use 730 indicates the number of storage extents that have already been carved from each array group. I/O usage ratio 740 indicates a percentage of the time that the array group is in use (i.e., executing data I/O) within a certain period of time, such as over the past hour, past day, past week, etc. The I/O usage ratio may be based on an average ratio over time or a maximum ratio over time, and indicates how busy the particular array group is. The I/O usage ratio may be measured by the storage controller 101 or by other means.

In the examples illustrated, line 791 represents a record of an array group which has "A1" as the array ID, has "8, 150, 238, 732, 578" bytes of free space, has "23" storage extents that have been already carved from this array group to the thin provisioning chunks which compose part of the thin provisioned volumes, and this array group is in use by data I/O an average of "12%" of the time. Line 792 represents a record of an array group "A2" that has 5 storage extents in use and an I/O usage ratio that shows that this array group is in use by data I/O "5%" of the time. Line 793 represents a record of an array group "A3" that has only one storage extent carved from it so far. This array group has an I/O ratio that indicates it is in use by data I/O "1%" of the time.

Table 213 is referred to by thin provisioning module 200 to determine an appropriate set of array groups from which to carve storage extents to compose a new thin provisioning chunk by taking into account of current utilization rates of each of the available array groups. Records on this table may be updated periodically by thin provisioning module 200 or by other means. For example, the "I/O Usage Ratio" is a dynamic value that can be updated periodically or can be updated according to a triggering event such as upon receipt of a request for allocation of a thin provisioning chunk, following the deletion of a thin provisioning chunk, or the like. Accordingly, the invention enables each portion of the thin provisioned volume to be independently evaluated for performance as it is allocated, which provides an advantage over systems in which an entire volume is initially allocated to a user.

FIG. 6 illustrates an exemplary process executed by thin provisioning module 200 when data is written to an area of a thin provisioned volume. When a client host 110 writes data to thin provisioned volume 220, if the write request is to an area of the volume that has not yet had data written to it, then thin provisioning module 200 will allocate one or more new thin provisioning storage chunks 230 to serve as the actual storage space for the area specified in the still virtual portion of the thin provisioned volume 220. In a preferred embodiment each storage chunk 230 can be of a fixed predetermined size in the thin provisioning storage system, so that the number of chunks 230 that need to be allocated in response to a write command is dependent on the size of the write data to be stored. Further, in the case where the write is to an area of the thin provisioned volume that has not yet had actual storage space allocated, the write data may be retained in cache such as in memory 103 while a storage chunk 230 is allocated. Alternatively, in some embodiments, the client host may merely send a write request, and then send the actual write data after the thin provisioning chunk is allocated. The steps illustrated in FIG. 6 that are carried out when a write is made to the thin provisioned volume 220 are described below.

Step 1500: Client host 110 writes data (or sends a write command) to one of the thin provisioned volumes on the storage system.

Step 1510: Thin provisioning module 200 checks whether a thin provisioning chunk 230 has already been allocated for the specified portion of the identified thin provisioned volume 220. If a chunk 230 has already been allocated, then the allocating process set forth in Steps 1520 and 1530 is skipped and the process proceeds to Step 1540. If a chunk 230 has not yet been allocated for the specified portion of the volume 220, the process goes to Step 1520 to generate a new chunk 230.

Step 1520: The process generates a new thin provisioning chunk 230 for the specified area of the thin provisioned volume 220 by allocating one or more storage extents from the storage media. According to the invention, the chunk is allocated taking into account the configured performance level for the thin provisioned volume. The details of Step 1520 are described further below with respect to FIG. 7.

Step 1530: The process allocates the new thin provisioning chunk obtained in Step 1520 to the area of the thin provisioned volume where the client host wrote the data by concatenating one or more allocated storage extents and mapping these to the thin provisioned volume 220.

Step 1540: The storage system executes the actual writing of the write data to the thin provisioning chunk allocated in Step 1530.

Step 1550: The storage system returns an acknowledgment of a successful write to the client host.

FIG. 7 illustrates an example of a process to generate a thin provisioning chunk that is executed by thin provisioning module 200 when a write request to an unallocated area of a thin provisioned volume is received by the storage system. This process corresponds to Step 1520 of FIG. 6 described above, and takes into account the desired performance level for the thin provisioned volume when allocating the storage space. The steps for generating a new thin provisioning chunk are set forth below.

Step 1600: At the start of this process, the volume ID for the target thin provisioned volume is passed to the process. The thin provisioning module 200 then uses the volume ID to obtain the assigned performance level of the specified volume from volume table 212.

Step 1610: The process then uses the performance level ascertained in Step 1600 to access the performance level table 211. From the performance level table 211, the process gets the value of the "number of storage extents to allocate" field 520 for the specified performance level. The number obtained shows how many storage extents are required to be carved from array groups to compose a new thin provisioning chunk.

Step 1620: Typically, the chunk size for a single thin provisioning chunk is fixed. Thus, in this step process determines an optimum size of each storage extent to be allocated by dividing the chunk size by the number obtained in Step 1610, i.e., the size of the storage extents=chunk size divided by number of storage extents to allocate.

Step 1630: The process then uses the array group table 213 to select the required number of array groups. Selection of the array groups may be performed based upon various performance metrics, including:

a) An array group that has a small amount in the "number of storage extents in use" field 730 (i.e., the fewest number of storage extents currently allocated) might be desirable because that may indicate less frequent data accesses from the client hosts because there are fewer hosts sharing that array group; and/or b) An array group having a low value in the "I/O Usage Ratio" field 740 is usually desirable because that indicates the data is less frequently accessed by the client hosts.

Step 1640: The process carves a certain size (obtained in Step 1620) of a storage extent from one of the selected array groups selected in Step 1630.

Step 1650: The process decreases the value of "Free Space" 720 in the array table 213 by the size of the allocated storage extent, and increments the value of the "number of storage extents in use" 730 of the processed array group record in array group table 213. After the all the array groups selected in Step 1630 have been processed, then the process proceeds to Step 1660; otherwise the process goes back to Step 1640 to process remaining array groups.

Step 1660: The process then composes a new thin provisioning chunk by concatenating the collected storage extents and mapping these to the specified area in the thin provisioned volume 220.

Further explanation of the functioning of the invention may be obtained from the example illustrated in FIG. 2. In FIG. 2, a thin provisioning chunk 230 is allocated in response to a write request by a client host 110. Upon receiving the request at controller 101, thin provisioning module 200 checks volume table 212, and determines that thin provisioned volume 220 is specified as having a silver performance level. A check of performance level table 211 shows that a silver performance level requires three storage extents to be allocated. Thin provisioning module 220 determines the size required for each of the storage extents by dividing the size of the chunk by three. Then, by referring to array group table 213, thin provisioning module 200 selects separate array groups 240-1, 240-2 and 240-N as the array groups having the most desirable performance. Thin provisioning module 200 then allocates separate storage extents 250-1, 250-2 and 250-N of the determined size, and concatenates these three storage extents as the new thin provisioning chunk 230. This new thin provisioning chunk is mapped to the specified storage area in the thin provisioned volume, and the write data is then stored to the storage extents that make up the thin provisioning chunk.

Additional Embodiments

Additional embodiments of the invention are disclosed that include the case of considering a disk-level of granularity, rather than an array-group-level when allocating storage extents for composing a new thin provisioning chunk. Many storage systems today provide array groups (e.g., RAID groups) as a pool of logical capacity from which to carve some size of storage extent. Accordingly, that situation is addressed by the embodiments described above. However, the present invention is also able to address the problem of performance deterioration occurring at each "disk" or individual storage medium due to conflicts during data access. Therefore, choosing the candidates to carve storage extents from according a granularity of disks rather than array groups is more efficient, and can produce even larger returns in overall performance. Most of the components and functions of the disk-level embodiments may be the same as described above in the array group embodiments. For example, the hardware configuration may be the same as that shown in FIG. 1. Accordingly, the differences in logical element structure and functionality are set forth below.

FIG. 8 illustrates the composition of a thin provisioning chunk 2230 of the disk-level embodiments. Thin provisioning chunk 2230 is composed of one or more storage extents, which is essentially the same structure as described in the earlier embodiments, except that the storage extents are allocated from individual storage media 105, rather than from array groups. Thus, the performance and suitability of each storage extent may be explicitly considered at a granularity at the disk level in the present embodiments.

FIG. 8 includes three array groups 2240-1, 2240-2, 2240-3, each comprised of five storage media 105. Because the storage media of these embodiments are able to be treated individually, the storage media are numbered 105-1 through 105-15. Further, while three array groups and fifteen storage media are shown, any reasonable number may be provided.

Further, while the storage media in this example are arranged in array groups, this is simply to enable provision of data protection, such as by using RAID technology. Thus, the invention may also be applied to a configuration in which there are no array groups, such as a JBOD (just a bunch of disks) configuration, or other configurations, such as RAID level 1 mirroring in which there are only pairs of disks for data protection, and the like. Therefore, the array groups in this embodiment could be ignored, and the logical configuration may be treated simply as there being many disks, each of which has independent utilization metrics. Thus when selecting the storage extents for composing a thin provisioning chunk 2230, the storage extents can be carved from any disks from any of the array groups.

In FIG. 8, two thin provisioned volumes are illustrated. A bronze level thin provisioned volume 2220-1, and a gold level thin provisioned volume 2220-2. A thin provisioning chunk 2230-1 is allocated to the bronze level volume 2220-1. Because performance level table 211 indicates that a bronze level is allocated one storage extent per thin provisioning chunk, only one storage extent 2250-1 is used to create thin provisioning chunk 2230-1. On the other hand, gold level volume 2220-2 is allocated a thin provisioning chunk 2230-2 that is composed of five storage extents 2250-2 through 2250-6. Further, in the present disk level embodiments, the storage extents 2250 are allocated from individual disks, rather than from an entire array group, as will be discussed in more detail below.

FIG. 9 illustrates an example data structure of a disk table 214 for use with the disk-level embodiments. In the disk level embodiments, the thin provisioning module 200 considers the utilization of each independent disk 105 in a manner similar to which it considered the utilization of array groups in the array group table 213 described in FIG. 5 above when determining from where to carve a storage extent. In the disk-level embodiments, the utilization amount of each of the individual disks may be used to determine the candidates from which to carve storage extents. Thus, disk table 214 includes a disk ID entry 2510 that identifies each eligible disk in the storage system 100. A free space entry 2520 indicates the amount of free space on each disk, which indicates the capability to carve storage extents of a certain size from the disk. The entry for number of storage extents in use 2530 indicates how many storage extents have already been carved from that disk. The I/O usage ratio 2540 indicates a ratio of the time that the disk is in use (i.e., executing data I/O) within a certain measured period of time, such as one hour. The I/O usage ratio 2540 may be an average percentage over a period of time (e.g., hours or day), a maximum percentage achieved over a period of time, or the like. Thus, the I/O usage ratio 2540 indicates how busy a particular disk is.

In the examples illustrated, line 2591 represents a record of a disk that has "D1" as its ID, has "28, 150, 238, 732" bytes of free space, "23" storage extents have been already carved from this disk to create thin provisioning chunks, and "45%" of the time it is in use for data I/O. On the other hand, line 2592 shows an I/O usage ratio of 12%, and line 2593 shows an I/O usage ratio of only 2%. Accordingly, these latter two disks would normally be considered better choices for allocating storage extents.

Disk table 214 is referred to by thin provisioning module 200 to find an appropriate set of disks to carve storage extents from when composing a new thin provisioning chunk by taking into account current utilization of the disks. As with the array group table 213, the records on this table may be updated by thin provisioning module 200 or by other means dynamically. For example, the "I/O Usage Ratio" 2540 is a dynamic value that it could be updated periodically, or could be updated upon the occurrence of some event, such as receiving a request for a thin provisioning chunk, deletion of a thin provisioning chunk, or the like.

FIG. 10 illustrates an example of a process to generate a thin provisioning chunk that is executed by thin provisioning module 200 in the disk-level embodiments. The process of FIG. 10 is similar to the process shown in FIG. 7 in the earlier embodiments, and only the portion of selecting candidates from which to carve storage extents is changed, as described below.

Steps 1600 to 1620 are the same as Steps 1600 to 1620 described in FIG. 7 in the embodiments above. These steps determine the number and the size of the storage extents.

Step 2630: The process selects a required number of disks from disk table 214 from which the one or more storage extents will be carved. Selection of the disks can be performed based upon various performance metrics, including:

a) Where a disk has a small amount for the "number of storage extent in use" 2530 (i.e., the fewest number of storage extents currently allocated), this may indicate less data accesses from other client hosts; and/or b) Having a low value of "I/O Usage Ratio" 2540 indicates that the disk currently is not accessed very frequently.

Step 2640: Once the candidate disks are selected, the process carves storage extents of the determined size (obtained in Step 1620) from one of the disks selected in Step 2630.

Step 2650: The process decreases the value of "Free Space" 2520 by the size of the carved storage extent, and increments the value of "number of storage extent in use" 2530 in the record for the processed disk in disk table 214. Once every disk selected in Step 2630 has had a storage extent allocated therefrom, the process proceeds to Step 1660; otherwise the process goes back to Step 2640 to allocate storage extents from the remaining disks.

Step 1660: The process then composes a new thin provisioning chunk by concatenating the allocated storage extents, and concludes.

As additional explanation, in the example set forth in FIG. 8, storage extent 2250-1 is allocated for thin provisioning chunk 2230-1, and has a size equivalent to the entire size of thin provisioning chunk 2230-1. On the other hand, storage extents 2250-2 through 2250-6 are allocated for the thin provisioning chunk 2230-2. Therefore, thin provisioning chunk 2230-1 will have a lower performance level than thin provisioning chunk 2230-2 because thin provisioning chunk 2230-2 is spread over five different disks, whereas thin provisioning chunk 2230-1 will have all its data stored on a single disk.

Furthermore, under additional embodiments of the invention, the allocation of storage extents may be made by taking into consideration not only the performance metrics of the individual disks, but also the utilization and other performance metrics of the entire array group in which the disks reside. Thus, the thin provisioning module 200 may refer to both the array group table 213 and the disk table 214 when determining from whence to carve a storage extent.

Also, as noted above, the array group table 213 and/or the disk table 214 can be dynamically updated following each allocation of a storage extent or deletion of a storage extent. For example, in FIG. 8, when the thin provisioning module searched for a storage extent to serve as thin provisioning chunk 2230-1, storage medium 105-1 was chosen as the best disk to use. However because that allocation may have caused the usage and allocation ratio to change substantially for storage medium 105-1 and array group 2240-1, then, when the thin provisioning module was searching for suitable disks for thin provisioning chunk 2230-2, storage medium 105-1 was no longer one of the best disks to use, and array group 2240-1 may no longer have been as optimal as array groups 2240-2 and 2240-3. Accordingly, the majority of the storage extents for thin provisioning chunk 2230-2 were allocated from the latter two array groups 2240-2 and 2240-3.

This invention may be used on storage systems which have a plurality of separate media, and especially when the structure of the storage system is encapsulated to the user by the storage virtualization technology such as thin provisioning technology. The thin provisioning storage system disclosed in this invention presents a virtual thin provisioned volume to the user which appears to be of the size that user requested or was assigned; however, the real capacity is not provisioned until it is actually used. The storage system automates a determination of how many and from which array group to allocate storage extents to compose a thin provisioning chunk. The storage system is able to obtain the target performance level of every thin provisioned volume so that it can decide the number of storage extents to carve when allocating a new thin provisioning chunk. Also the thin provisioning module of the invention will select appropriate array groups or disks from which the storage extents will be carved when allocating each thin provisioning chunk of the thin provisioned volume. This determination may be made by taking account of utilization of each array group or individual disk or both.

The invention improves performance of thin provisioned volumes by ensuring that allocated storage space is distributed over a plurality of different physical storage devices, and will help ensure a certain level of data access performance of the thin provisioning storage system by avoiding or relieving conflicts of allocating storage extents on a single disk, and instead distribute these over separate disks or disk arrays. A user or administrator is able to specify a desired level of performance, and the storage system will distribute allocated storage extents to attempt to achieve this performance level.

Thus, it may be seen that the invention provides a method to automate distribution of data access on a thin provisioning storage system to improve performance, and thereby addresses the problem of disk capacity outstripping disk performance. Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of allocating storage space on a storage media for use in a volume, said storage media being configured in multiple array groups, the method comprising:
   receiving a write command to store write data to the volume;
   determining a plurality of array groups out of the multiple array groups from which to allocate a plurality of storage extents on the storage media to store the write data in response to said write command;
   determining a designated performance level for said volume after receiving said write command; and
   determining a number of storage extents to be allocated based on said designated performance level,
   wherein each of said allocated plurality of storage extents is located in different storage mediums of said plurality of storage mediums,
   wherein the plurality of array groups are chosen based upon a performance metric of the array groups; and
   allocating the plurality of storage extents from different array groups for storage of the write data in response to said write command, according to the determined number of storage extents to be allocated based on said designated performance level.

2. A method according to claim 1,
   wherein said storage media includes a plurality of storage mediums, wherein said plurality of storage mediums are divided to said plurality of array groups,
   wherein the step of determining the one or more array groups based upon said performance metric includes that said performance metric is based upon a usage amount of the each of the array groups for input/output operations over a period of time.

3. A method according to claim 1, wherein the step of determining the one or more array groups includes that said performance metric is based at least in part upon which array group has the fewest number of storage extents currently in use.

4. A method according to claim 1, further including a step of
   allocating at least two said storage extents when the number of storage extents to be allocated is two or more; and
   concatenating said storage extents into a logical storage space forming part of said volume for storing said write data in response to said write command.

5. A method according to claim 1, further including a step of
   updating dynamically said performance metric of said multiple array groups following said allocation of said one or more storage extents so that when future storage extents are allocated to said volume, the performance metric remains accurate.

6. A method according to claim 1, further including steps of
   providing a plurality of disk drives as said storage media; and
   configuring said disk drives in said array groups in a RAID configuration to provide data protection to data stored to said volume.

7. A method according to claim 1,
   wherein when said designated performance level for a first write command is higher than said designated performance level for a second write command, a number of storage extents to be allocated for said first write command is higher than a number of storage extents to be allocated for said second write command.

8. A method according to claim 7,
   wherein when said designated performance level for said first write command is higher than said designated performance level for said second write command, a size of storage extents to be allocated for said first write command is small than a size of storage extents to be allocated for said second write command.

9. A system for storing data, comprising:
   a storage system including a plurality of a disk drives and a controller for controlling input/output (I/O) operations to said disk drives;
   a computer in communication with said storage system for conducting said I/O operations with said storage system;

said controller being programmed to present a volume to said computer to which said computer can store write data in response to a write command, wherein storage space on said disk drives is not allocated to at least some portions of said volume until said computer issues a command to store the write data, in response to said write command, to an area of said volume that does not currently store data, said controller being programmed to determine how many separate storage extents from said disk drives to allocate to said area of said volume based upon a performance level designated for said volume, and wherein said storage extents are each allocated from different disk drives, wherein said controller is programmed to present said volume to said computer and to allocate the separate storage extents from said disk drives for storage of the write data, in response to said write command, according to the determined separate storage extents from said disk drives to allocate to said area of said volume based on the performance level designated for said volume.

10. The system according to claim 9, wherein
said controller includes a means for determining from which disk drives to allocate storage extents based on a performance metric for each of said disk drives.

11. The system according to claim 10, wherein
said performance metric is an I/O usage ratio of each of said disk drives measured over a period of time.

12. A system according to claim 11, wherein
said disk drives are configured into multiple array groups, wherein each array group is comprised of multiple said disk drives, wherein when the number of storage extents to be allocated is two or more, the controller allocates the storage extents on two or more separate array groups.

13. A system according to claim 12, wherein
said controller includes a means for determining from which array groups to allocate storage extents based on a performance metric for each of said array groups.

14. A system according to claim 12, wherein
said controller is programmed to take into account both a performance metric of individual disk drives, and a performance metric of the array groups when determining where to allocate said storage extents.

15. A system according to claim 9, wherein
when two or more storage extents are allocated, said controller concatenates said storage extents into a logical storage space for storing said write data in response to said write command.

16. A system according to claim 9, wherein
said storage controller dynamically updates a performance metric of said disk drives following allocation of said one or more storage extents, so that when future storage extents are allocated to said volume the performance metric remains accurate, the performance metric being used in determining optimal disk drives from which to allocate the storage extents.

17. A method of operating a storage system, comprising:
providing a storage system having multiple disk drives and a controller for controlling access to the disk drives;
presenting a volume to a computer, whereby said computer stores data to said volume as if storage space on said disk drives was allocated for said volume, while at least a portion of the volume does not initially have storage space on said disk drives allocated;
receiving a write request from said computer to store write data, said write request being directed to an area of said volume for which storage space on said disk drives has not yet been allocated;
determining a designated performance level for said volume;
determining a number of separate storage extents to be allocated to said area of said volume to store write data in response to said write request based upon said determined performance level; and
allocating the determined number of separate storage extents as said storage space on said disk drives for said volume to store write data in response to said write request,
wherein said storage extents are each allocated from different disk drives.

18. A method according to claim 17, further including steps of
configuring said disk drives into array groups, and
selecting said determined number of storage extents on said array groups based upon a performance metric for each array group.

19. A method according to claim 18, further including a step of
selecting one or more array groups from which to allocate said storage extents by choosing one or more array groups based upon an input/output usage amount of the array groups measured over a period of time.

20. A method according to claim 17, further including steps of
configuring said disk drives into array groups; and
allocating storage extents from at least two separate array groups when the number of storage extents to be allocated is two or more.

21. A method according to claim 17, further including a step of
dynamically updating a performance metric of said disk drives following allocation of one or more of said storage extents so that when future storage extents are allocated to said volume the performance metric remains accurate, the performance metric being used in determining optimal disk drives from which to allocate the storage extents.

22. A method according to claim 1,
wherein said determining and said allocating are performed, in response to the write request, by a thin provisioning module in a controller of a storage system which has said storage media.

23. A method according to claim 17,
wherein said determining a designated performance level for said volume, said determining a number of separate storage extents to be allocated to said area of said volume to store write data, and said allocating are performed, in response to the write request, by the controller of the storage system.

* * * * *